United States Patent [19]

Nishimura

[11] Patent Number: 4,719,410
[45] Date of Patent: Jan. 12, 1988

[54] REDUNDANCY-SECURED SEMICONDUCTOR DEVICE

[75] Inventor: Yasumasa Nishimura, Itami, Japan

[73] Assignee: Mitsubishi Denki Kabushiki Kaisha, Tokyo, Japan

[21] Appl. No.: 770,571

[22] Filed: Aug. 29, 1985

[30] Foreign Application Priority Data

Aug. 31, 1984 [JP] Japan .................. 59-183072

[51] Int. Cl.⁴ ..................... G01R 31/28; G08B 29/00
[52] U.S. Cl. ................................. 324/73 R; 340/653
[58] Field of Search ............ 324/73 R; 340/507, 508, 340/653; 307/441

[56] References Cited

U.S. PATENT DOCUMENTS 4,215,340 7/1980 Lejon ................................. 340/653

OTHER PUBLICATIONS

"Session XII: Dynamic Memories" by Ronald P. Cenker, et al, *Digest of Technical Papers* 1979 IEEE, pp. 150–151, 290.

"Session VIII: Memories and Redundancy Techniques" by Kim Kokkonen et al, Digest of Technical Papers, 1981 IEEE, pp. 80–81.

*Primary Examiner*—Ernest F. Karlsen
*Attorney, Agent, or Firm*—Birch, Stewart, Kolasch & Birch

[57] ABSTRACT

A redundancy-secured semiconductor device, comprising: primary semiconductor elements and secondary semiconductor elements, the secondary elements being spare, redundant elements for performing the functions of the primary elements that may contain faults. The primary elements are selectively disabled if a fault is found during a redundancy test and a secondary element is substituted therefor. The substituted secondary element is then tested for performance criteria at the time of the redundancy test.

3 Claims, 2 Drawing Figures

REDUNDANCY-SECURED SEMICONDUCTOR DEVICE

FIELD OF THE INVENTION

The present invention relates to a semiconductor device with a redundancy circuit.

BACKGROUND OF THE INVENTION

In order to explain the background of the present invention, reference will be particularly made to FIG. 1:

In FIG. 1, the reference numeral 1 designates a semiconductor device with a redundancy circuit. The numerals 2 and 3 designate external input terminals of the semiconductor device 1. The numerals 4 and 5 designate input protection circuit portions. The input protection circuit portion 4 is constituted by MOS gates 4a, 4b and the resistances 4c, 4d. The numeral 6 designates a redundancy distinction circuit for distinguishing the use or non-use of the redundancy circuit. This redundancy distinction circuit 6 is constituted by a fuse 6a and a MOS gate 6b. The numeral 7 designates a ground line of the semiconductor device.

The judgement as to whether the redundancy circuit is used or not in this prior art device is conducted as follows:

The faulty portion generated due to the contaminations and the crystal defects of the wafer is replaced by the corresponding redundancy circuit. This technique is widely accepted as a redundancy circuit technique in a wafer production process for semiconductor devices with the advance of high integration of the semiconductor devices. The information as to whether the redundancy circuit is used or not in the semiconductor device is required in evaluating and analyzing the semiconductor device, and it can be easily recognized from the external input terminal 2. In a semiconductor device with a redundancy circuit the fuse 6a is cut off by an apparatus for replacing the redundancy circuit in a redundancy circuit replacement process. The cutting off of the fuse is conducted by blowing off the fuse by using a laser beam or a large current. The existence or non-existence of the fuse can be easily recognized by conducting a measurement against the external input terminal 2 as in the following:

The MOS gates 4b, 6b lare turned on by applying a negative voltage to the external input terminal 2, and then a current is flows out to the external input terminal 2 from the ground line 7 through the MOS gate 4b and the resistance 4c. When the fuse 6a is not blown off, a current also flows out to the external input terminal 2 from the ground line 7 through the MOS gate 6b, the fuse 6a, and the resistance 4c. That is, the value of the current flowing out to the external input terminal 2 is changed in accordance with the fuse 6a being cut off or not, and the current when being cut off becomes about half of that when not being cut off. It is easily possible to judge the use or non-use of the redundancy circuit by measuring this value by an inspection apparatus for the semiconductor device. The measurement is generally called a pin contact test, which is a fundamental one among the semiconductor device checking items, and the measurement time therefor is a short time of several milli-seconds.

Each semiconductor device on a wafer after a wafer process is executed thereto is wafer-tested. In this wafer test, the semiconductor device is again subjected to a test which is more severe than that executed in judging the capability of a redundancy circuit replacement. The function test items executed in the redundancy circuit replacement process are usually executed also in the wafer test items. That is, the similar function test items are executed two times regardless of a good or a bad product.

In this prior art semiconductor device with a redundancy circuit the use or non-use of the redundancy circuit can be detected directly. However, it is necessary to execute a function test again in order to judge the goodness or badness of the semiconductor device, thereby requiring a time for a bad product test in a wafer test as the next inspection process. The time required for this bad product test is about 0.5 seconds in a 1 Mbit RAM assuming that 1 bit is tested in 500 nsec.

Another prior art redundancy secured semiconductor device is disclosed in an article "A Fault-Tolerant 64 K Dynamic RAM" by R.P. Cenker et al. ISSCC 79/Thursday, February 15, '79. In this device, a polysilicon fuse which is blown off by a laser beam is inserted at the corresponding address line so as to enable the replacement of the faulty cell by the redundancy cell.

The other prior art redundancy secured semiconductor device is disclosed in an article "Redundancy Techniques for Fast Static RAMs" by K. Kokkonen et al., ISSCC 81/Wednesday, Feb., '81. In this device, a polysilicon fuse which is electrically blown off from the outside of the device is inserted at the corresponding address line so as to enable the replacement of the faulty cell by the redundancy cell.

SUMMARY OF THE INVENTION

The present invention is directed to solve the problems pointed out above, and has for its object to provide a redundancy-secured semiconductor device capable of reducing the time for a bad product test.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a redundancy-secured semiconductor device, comprising:

primary semiconductor circuit means for performing predetemined functions in the semiconductor device;

secondary semiconductor means for performing the same predetermined functions as said primary semiconductor circuit means when said primary semiconductor circuit means is detected to be faulty;

means for selectively disabling said primary semiconductor circuit means in order to substitute said secondary circuit means for said primary faulty circuit means as an operative component in said device; and fault distinction circuit means for distinguishing whether said faulty primary semicondutor circuit means is substituted by said secondary semiconductor circuit means as an operative component in said device or not, which fault distinction means is marked when it is found that the substitution is not applicable or it is found that said replaced secondary semiconductor circuit means is inoperable as a result of a performance test of said semiconductor device which is conducted just after said disabled primary semiconductor circuit means is replaced by said secondary semiconductor circuit means.

DETAILED DESCRIPTION OF THE PREFERRED EMBODIMENT

Figure 1:
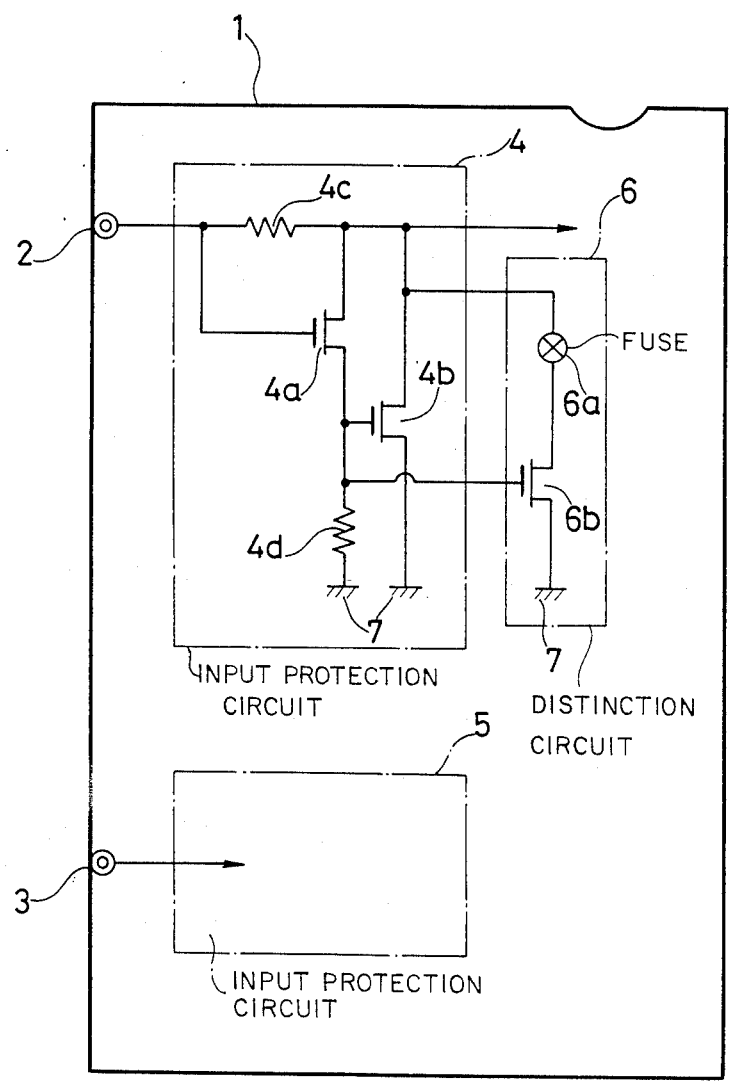
FIG. 1 is a circuit diagram showing a prior art redundancy-secured semiconductor device.
Figure 2:
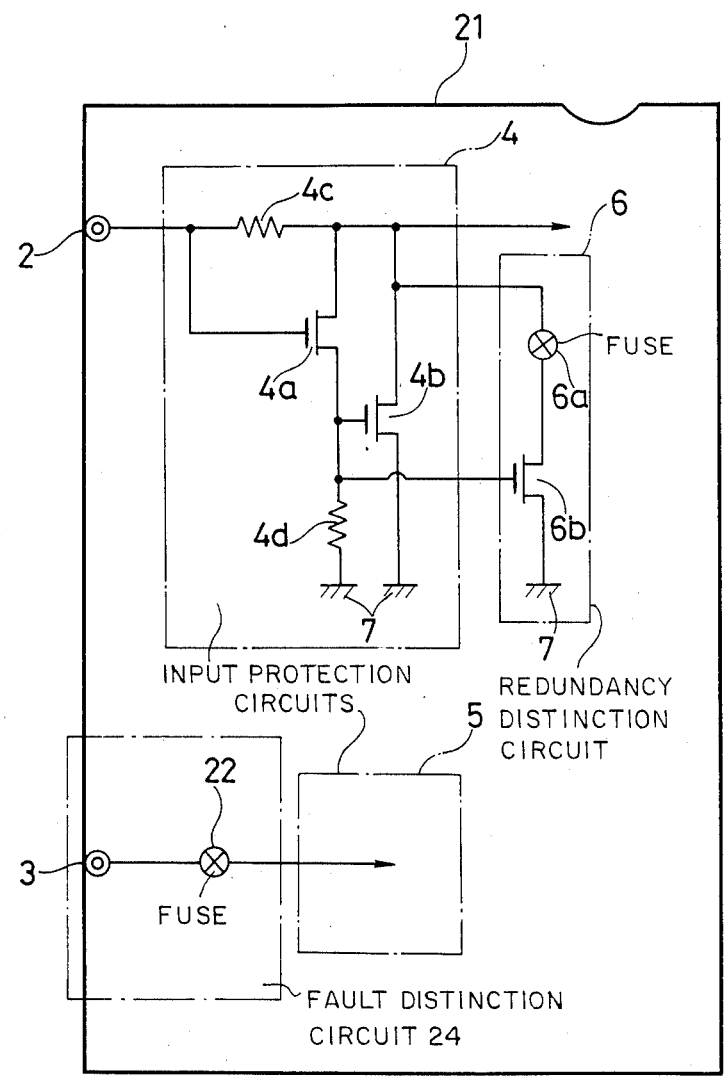
FIG. 2 is a circuit diagram showing a redundancy-secured semiconductor device as one embodiment of the present invention.

In order to explain one embodiment of the present invention in detail, reference will be particularly made to FIG. 2 wherein the same reference numerals designate the same or corresponding elements as those shown in FIG. 1:

The reference numeral 21 designates a semiconductor device with a redundancy circuit. The reference numeral 22 designates a fuse for distinguishing as to whether the product is bad or not. This information is stored in the fuse 22 during the redundancy circuit replacement process. The fuse 22 and the external input terminal 3 to which the fuse 22 is connected constitute a fault distinction circuit 24.

The judgement as to whether the product is good or not in the device under such a construction is conducted as follows:

The redundancy secured semiconductor device 21 is inspected as to whether it operates a desired function in a redundancy circuit replacement process of the wafer process. If the faulty portion can be replaced by a redundancy circuit provided at the semiconductor device the replacement is executed. The semiconductor device 21 is again subjected to a function inspection after the replacement is executed. When it is judged to be bad, or when the incapability of the replacement is discovered at the time of the first judgement of the replacement capability, the semiconductor device is judged to be bad, and the fuse 22 is cut off. This cutting off is conducted similarly to the cutting off of the corresponding fuse in the usual process of the redundancy circuit replacement. After the conclusion of a wafer process there are produced on the wafer only semiconductor devices capable of becoming good products and devices which are clearly bad products with the fuse 22 cut off. By conducting firstly a pin contact test against the external input terminal 3 to which the fuse 22 is connected, the semiconductor device which is already judged as bad can be judged as bad in several milliseconds, and thereafter, marks are applied to the faulty semiconductor devices.

In the illustrated embodiment, a fuse for distinguishing as to whether the product is bad or not is provided and connected to the external input terminal other than the external input terminal 2 which is used for distinguishing the use or non-use of the redundancy circuit, but this fuse can be provided and connected to another external output terminal.

As evident from the foregoing, according to the present invention, a distinction circuit is provided so as to enable the device to store information as to whether the product is bad or not thereinto during the redundancy circuit replacement process, thereby decreasing the time for a bad product test in the wafer test executed thereafter.

What is claimed is:

1. A redundancy-secured semiconductor device comprising:

primary semiconductor circuit means for performing predetermined functions in the semiconductor device;

secondary semiconductor means for performing the same predetermined functions as said primary semiconductor circuit means when said primary semiconductor circuit means is detected to be faulty;

means for selectively disabling said primary semiconductor circuit means in order to substitute said secondary circuit means for said faulty primary circuit means as an operative component in said device; and fault distinction circuit means for distinguishing whether said faulty primary semiconductor circuit means is substituted by said secondary semiconductor circuit means as an operative component in said device or not, which fault distinction means is marked when it is found that the substitution is not applicable or it is found that said replaced secondary semiconductor circuit means is inoperable as a result of a performance test of said semiconductor device which is conducted just after said disabled primary semiconductor circuit means is replaced by said secondary semiconductor circuit means.

2. The redundancy-secured semiconductor device of claim 1, wherein said distinction circuit means comprising;

fuse means connected in circuit with said secondary semiconductor circuit means; and a terminal pin connected to said fuse means provided externally of said semiconductor device, said fuse means being marked by being blown to open circuit said terminal.

3. The redundancy-secured semiconductor device of claim 2, wherein said means for disabling includes a fuse in circuit with said primary semiconductor circuit means.

* * * * *